US006221596B1

(12) United States Patent
Yemini et al.

(10) Patent No.: US 6,221,596 B1
(45) Date of Patent: Apr. 24, 2001

(54) SYSTEM AND METHOD FOR IDENTIFYING AND ISOLATING RARE CELLS FROM A MIXED POPULATION OF CELLS

(75) Inventors: Adi Yemini; Ziva Yemini, both of Raanana (IL)

(73) Assignee: Motobit Ltd. (IL)

( * ) Notice: Subject to any disclaimer, the term of this patent is extended or adjusted under 35 U.S.C. 154(b) by 0 days.

(21) Appl. No.: 09/312,770

(22) Filed: May 17, 1999

(51) Int. Cl.$^7$ ...................................................... C12Q 1/68
(52) U.S. Cl. ....................................................... 435/6; 435/2
(58) Field of Search ............................. 435/6, 2, 4, 7.21, 435/7.24, 7.25; 359/362

(56) References Cited

U.S. PATENT DOCUMENTS 4,000,417 * 12/1976 Adkisson et al. ..................... 250/201
5,503,981    4/1996 Mueller et al. .

OTHER PUBLICATIONS

MICRO21, www.imii.com/html/micro21.html, Dec. 4, 1997.*
Takabayashi et al. "Development of non–invasive Fetal DNA Diagnosis from Maternal Blood" Prenatal Diagnosis, vol. 15, p. 74–77, 1995.*
Tutschek et al. "Isolation of Fetal Cells from Transcervical samples by micromanipulation" Prenatal Diagnosis, vol. 15, p. 951–960, 1995.*
Cheung et al. "Prenatal diagnosis of sickle cell anaemia and thalassaemia by analysis of fetal cells in maternal blood", Nature Genetics, vol. 14, Nov. 1996.*
Johansen et al. "An investigation of methods for enriching trophoblast from maternal blood" Prenatal Diagnosis, vol. 15, pp. 921–931, 1995.*
On–line Medical Dictionary, www.graylab.ac.uk/cgi–bin/omd?morphology Sep. 1997.*
Mueller, U. W. et al., "Isolation of Fetal Trophoblast Cells From Peripheral Blood of Pregnant Women", The Lancet, vol. 336, pp. 197–200, Jul. 28, 1990.
Bianchi, D., "Current Knowledge About Fetal Blood Cells in the Maternal Circulation", J. Perinat. Med., vol. 26, 1998, pp. 175–185.
Chua, S. et al., "Trophoblast Deportation in Pre–Eclamptic Pregnancy", British Journal of Obstetrics and Gynaecology, vol. 98, Oct. 1991, pp. 973–979.
Tanke, H.J. et al., "Detection of 'Rare Event', Fetal Erythroblasts in Maternal Blood Using Automated Microscopy", Early Human Develop., Dec. 30, 1996, vol. 47, Suppl. S89, NCBI Abstract, pg. 1.
Hahn, S. et al., "Fetal Cells in Maternal Blood: Current and Future Perspectives", Molecular Human Reproduction, vol. 4, No. 6, pp. 515–521, 1998.
Hawes, C. et al., "A Morphologic Study of Trophoblast Isolated From Peripheral Blood of Pregnant Women", Amer. J. Obstet. Gynecol., May 1994, vol. 170, No. 5, part I, pp. 1297–1300.
Douglas, G. W. et al., "Trophoblast in the Circulating Blood During Pregnancy", Amer. J. Obstet. Gyn., Nov. 1959, vol. 78, No. 5, pp. 960–973.
Oosterwijk, Jan C. et al., "Fetal Cell Detection in Maternal Blood: A Study in 236 Samples Using Erythroblast Morphology, DAB and HbF Staining, and FISH Analysis", Cytometry vol. 32, pp. 178–185, 1998.
Oosterwijk, Jan C. et al. "Strategies for Rare–Event Detection: An Approach for Automated Fetal Cell Detection in Maternal Blood", Am. J. Hum. Genet., vol. 63, pp. 1783–1792, 1998.

* cited by examiner

Primary Examiner—Lisa B. Arthur
Assistant Examiner—Jeanine Enewold
(74) Attorney, Agent, or Firm—Hoffman Wasson & Gitler PC (57) ABSTRACT

A method for isolating a rare cell type from a sample including a mixed population of cells is provided, which employs (a) an image processor being designed for morphologically differentiating the rare cell type from the mixed population of cells; (b) a magnifying device communicating with the image processor for providing a magnified image of at least a portion of the sample to the image processor; and (c) a micromanipulator for retrieving the rare cell type out of the mixed population of cells according to information provided by the image processor.

7 Claims, 2 Drawing Sheets

SYSTEM AND METHOD FOR IDENTIFYING AND ISOLATING RARE CELLS FROM A MIXED POPULATION OF CELLS

FIELD AND BACKGROUND OF THE INVENTION

The present invention relates to a system and method for identifying and sorting out rare cells from a mixed population of cells. More particularly, the present invention relates to a system and method which incorporate a cell isolation system including an image processor and a micromanipulator for identifying and sorting out rare cells from a mixed population of cells. The present system and method can be used, for example, to identify and isolate very rare fetal cells having unique morphological features, such as trophoblasts, from a maternal blood sample, such fetal cells can then be subjected to a variety of prenatal diagnostic methods.

Fetal tissue, and in particular fetal DNA, is routinely used in prenatal diagnosis and other medical procedures which require an accurate assessment of the genome of the fetus. Currently, fetal tissue is obtained through the use of amniocentesis, chorionic villi sample (CVS), fetoscopy, or cordocentesis. Thompson and Thompson Genetics in Medicine, 5th Edition, W. B. Saunders Co., Phila., 1991, provides further detail describing these techniques.

Thus, in amniocentesis, a sample of amniotic fluid, which contains fetal cells, is transabdominally removed from the mother with a needle coupled to a syringe. Amniocentesis has inherent associated risks. The major risk is induction of miscarriage which is estimated to occur in approximately 0.5% of all amniocentesis procedures. Other risks include maternal infection and physical damage to the fetus.

In CVS, fetal trophoblast tissue is aspirated from the villi area of the chorion transcervically or transabdominally. The rate of fetal loss associated with this method may be as high as 1%.

Cordocentesis provides a method of obtaining fetal blood directly from the umbilical cord with ultrasonic guidance.

Although generally efficient in retrieving fetal tissue, each of these invasive methods carries great risks to both the mother and the fetus.

A variety of fetal cell types such as, for example, platelets, trophoblasts, erythrocytes and leukocytes cross the placental blood barrier and circulate transiently within maternal blood (Schroder, J., J. 1975, Med. Genet. 12:230–242; Douglas G. W. et al. 1959, Am. J. Obstet. Gynec., 78:960–973).

The identification and isolation of such fetal cells from a maternal blood sample provides a highly desirable non-invasive method for acquiring fetal genetic material for prenatal genetic testing. A major drawback to utilizing such fetal cells as a source of fetal tissue is due to their extreme rarity in maternal blood. For example, one recent report estimates that in the case of fetal erythrocytes, a maternal blood sample contains approximately one fetal erythrocytes to $1 \times 10^7 - 1 \times 10^8$ maternal cells (Simpson and Elias, 1993, JAMA 270:2357).

Although several detection methods have been made available through recent advances, including polymerase chain reaction (PCR) and fluorescence in situ hybridization (FISH), the major difficulty in the routine use of maternal blood for prenatal diagnosis is the inability to enrich the small number of fetal cells in a mixture of maternal cells to yield reliable diagnostic results. It will be appreciated in this respect that substantially zero tolerance for maternal DNA containing cells is tolerated.

Thus, due to the extreme rarity of fetal cells in maternal blood, a number of specialized techniques to enrich and/or isolate the fetal cell fraction or the fetal genetic material from maternal blood have been designed.

One approach has been to use enrichment methods such as gradient centrifugations for isolating fetal cells, see, for example, U.S. Pat. No. 5,432,054. Although limited separation can be achieved using such methods, these methods are typically not sensitive enough to effect the isolation of a fetal cell fraction usable for highly reliable genetic testing, e.g., substantially zero tolerance. In addition, the currently used enrichment methods such as gradient centrifugation all result in substantial cell loss, thereby reducing the number of fetal cells available for subsequent analysis or for use with subsequent cell sorting or enrichment techniques.

Another more sensitive approach that has been utilized in an attempt to isolate fetal cells from a maternal blood sample utilizes labeled antibodies specific for a particular fetal cell type. Antibody labeled cells can then be isolated by a variety of methods which depend on the recognition of the antibody label. For example, fetal cell specific antibodies can be used to label fetal cells in order to facilitate separation of these cells from maternal cellular components by flow cytometry (Herzenberg, L. A., et al., Proc. Natl. Acad. Sci. USA 76, 1453–1455 (1979); Iverson, G. M., et al., Prenatal Diagnosis 1, 61–73 (1981); Bianchi, D. W., et al., Prenatal Diagnosis 11, 523–528 (1991) which can utilize fluorescent activation cell sorting (FACS, Herzenberg et al., 1979, Proc. Natl. Aca. Sci. USA 76:1453), magnetic-activated cell sorting (MACS, Ganshirt-Ahlert et al., 1992, Am. J. Obstet. Gynecol. 166:1350) or a combination of both procedures (Ganshirt-Ahlert et al., 1992, Am. J. Hum. Genet. 51:A48). In addition, a combination of gradient centrifugation and flow cytometry methods can also be used to increase the isolation or sorting efficiency.

Although the non-invasive flow cytometry sorting methods provide an alternative to the currently used invasive techniques, limitations inherent to their design limits such methods from being widely practiced.

A major limitation inherent to the flow cytometry techniques arises from the antibodies utilized by such techniques. Such antibodies, although generated cell specific, often cross react with other unwanted cell types which are in far higher concentration in the sample. As a result, such methods are often only sufficient in enriching for fetal cell types and cannot be used for reliable, zero tolerance, fetal cell isolation.

Several publications describe the isolation of fetal cells via micromanipulation.

Tutschek B. et al., "Isolation of fetal cells from transcervical samples by micromanipulation: Molecular conformation of their fetal origin and diagnosis of fetal aneuploidy" Prenatal Diagnosis. Vol. 15: 951–960, 1995, teach the isolation of fetal cells from transcervical samples by micromanipulation to thereby reduce a possibility of co-isolation of maternal cells. However, Tutschek B. et al. fail to teach isolation of rare cells from maternal blood samples.

Takabayashi H. et al. "Development of a non-invasive fetal DNA diagnosis from maternal blood" Prenatal Diagnosis, Vol. 15:74–77, 1995, teach detection and retrieval of Pappenheim stained fetal nucleated erythrocytes from maternal blood samples via micromanipulation. However, Takabayashi H. et al. fail to teach the isolation of trophoblasts from maternal blood, which are much rarer than fetal nucleated erythrocytes, yet much more morphologically distinct. Furthermore, Takabayashi H. et al. fail to teach image processing doing so.

Cueung M. et al. "Prenatal diagnosis of sickle cell anemia and thalassemia by analysis of fetal cells in maternal blood" Nature Genetics, Vol. 14:264–268, 1996, teach the scraping of fetal nucleated erythrocytes stained with an anti-fetal globin antibody from microscopic slides. However, Cueung M. et al. fail to teach the isolation of trophoblasts from maternal blood, which are much rarer than fetal nucleated erythrocytes, yet much more morphologically distinct. Furthermore, Cueung M. et al. fail to teach image processing doing so. In addition, Cueung M. et al. fail to teach morphological identification of the fetal cells, rather Cueung M. et al. teach the use of immunostaining which does not highlight cellular structures, rather highlights cells in a yes or no fashion and in addition may cross react with maternal cells, which where shown to coexpress fetal globins, resulting in co-isolation of maternal cells.

At present, there remains a need for a rapid and reproducible procedure suitable for processing a large volume of whole blood, and which produces highly efficient isolation of fetal cells from maternal blood.

There is thus a widely recognized need for, and it would be highly advantageous to have, a system and method for the isolation of fetal cells from a maternal blood sample devoid of the above limitations and which qualifies with the zero tolerance requirement.

SUMMARY OF THE INVENTION

According to one aspect of the present invention there is provided a cell isolation system for isolating a rare cell type from a sample including a mixed population of cells, the system comprising (a) an image processor being designed for morphologically differentiating the rare cell type from the mixed population of cells; (b) a magnifying device communicating with the image processor for providing a magnified image of at least a portion of the sample to the image processor; and (c) a micromanipulator for retrieving the rare cell type out of the mixed population of cells according to information provided by the image processor.

According to another aspect of the present invention there is provided a method for isolating a rare cell type from a sample including a mixed population of cells, the method comprising the steps of (a) providing a magnified image of at least a portion of the sample; (b) morphologically identifying the rare cell type from the population of cells; and (c) retrieving the identified rare cell type using a micromanipulator.

According to further features in preferred embodiments of the invention described below, the system further comprising a sample flow device for feeding the sample in continuous flow to the magnifying device.

According to still further features in the described preferred embodiments the system further comprising a mechanism being coupled to the magnifying device and the image processor, the mechanism being for manipulating optical properties of the magnified image, so as to provide a manipulated image to the image processor.

According to still further features in the described preferred embodiments the system further comprising a control unit for effecting the automatic or semi automatic retrieval of the rare cell type out of the mixed population of cells.

According to still further features in the described preferred embodiments the step of morphologically identifying the rare cell type from the mixed population of cells is effected by an image processor designed for automatically or semi automatically morphologically differentiating the rare cell type from the mixed population of cells.

According to still further features in the described preferred embodiments the method further comprising the step of enriching the sample for the rare cell type prior to the step of providing the magnified image.

According to still further features in the described preferred embodiments the method further comprising the step of staining the population of cells with a viability compatible, morphology enhancing, stain prior to the step of providing the magnified image.

According to still further features in the described preferred embodiments the method further comprising the step of optically manipulating the magnified image resulting from the step of providing the magnified image.

According to still further features in the described preferred embodiments the rare cell type is a fetal cell type and further wherein the sample is a maternal blood sample, the image processor is programmed and designed for morphologically differentiating the fetal cell type form the mixed population of cells present in the maternal blood sample.

According to still further features in the described preferred embodiments the fetal cell type is selected from the group consisting of fetal platelets, fetal trophoblasts, fetal nucleated red blood cells and fetal leukocytes.

According to still further features in the described preferred embodiments the fetal cell type is fetal trophoblasts.

According to still further features in the described preferred embodiments the image processor includes an image processing software for automatically or semi automatically processing the magnified image to differentiate the rare cell type from the mixed population of cells.

According to still further features in the described preferred embodiments the step of providing a magnified image is effected by a light microscope.

According to still further features in the described preferred embodiments the light microscope is selected from the group consisting of an inverted light microscope, a confocal microscope, and a phase microscope.

According to still further features in the described preferred embodiments the step of enriching the sample for the rare cell type is effected by at least one procedure selected from the group consisting of gradient centrifugation, affinity purification, size exclusion chromatography and selective cell lysis.

According to yet another aspect of the present invention there is provided a method of prenatal diagnosis, the method comprising the steps of (a) isolating fetal trophoblasts from a maternal blood sample by (i) providing a magnified image of at least a portion of the maternal blood sample; (ii) morphologically identifying the trophoblasts from the mixed population of cells contained within the maternal blood sample; and (iii) retrieving the identified trophoblast using a micromanipulator; and (b) subjecting the retrieved trophoblasts to a prenatal diagnosis procedure.

According to still further features in the described preferred embodiments the step of morphologically identifying the fetal trophoblast from the mixed population of cells contained within the maternal blood sample is effected by an image processor designed for automatically or semi automatically morphologically differentiating the rare cell type from the mixed population of cells.

According to still further features in the described preferred embodiments the method further comprising the step of culturing the retrieved trophoblasts prior to the step of subjecting the retrieved trophoblasts to a prenatal diagnosis procedure.

According to still further features in the described preferred embodiments the prenatal diagnosis procedure is selected from the group consisting of analysis of nucleic acids and analysis of proteins.

According to still further features in the described preferred embodiments the analysis of nucleic acids is effected by at least one procedure selected from the group consisting of nucleic acid amplification, nucleic acid mutation detection and nucleic acid sequence detection.

According to still further features in the described preferred embodiments the nucleic acid amplification is selected from the group consisting of enzymatic amplification of nucleic acids and chemical amplification of nucleic acids.

According to still further features in the described preferred embodiments the enzymatic amplification of nucleic acids is selected from the group consisting of polymerase chain reaction and ligase chain reaction.

According to still further features in the described preferred embodiments the nucleic acid mutation detection and nucleic acid sequence detection are each independently effected by at least one procedure selected from the group consisting of nucleic acid sequencing, Southern blotting, Northern blotting, nuclease protection analysis, single nucleotide primer extension, allele specific oligonucleotide hybridization, restriction fragment length polymorphism, single stranded conformational polymorphism, denaturing gradient gel electrophoresis and temperature gradient gel electrophoresis.

According to still further features in the described preferred embodiments the analysis of nucleic acids includes karyotyping analysis.

According to still further features in the described preferred embodiments the analysis of proteins is effected by at least one procedure selected from the group consisting of gel electrophoresis, Western blotting, in situ antibody recognition, affinity separation, affinity chromatography and amino acids microsequencing.

The present invention successfully addresses the shortcomings of the presently known configurations by providing a system and method for manually, semi automatically or automatically isolating a rare cell type from a mixed population of cells based on unique morphological features of the rare cell type which is, according to preferred embodiments of the present invention, recognized by image processing. As such, the system and method according to the present invention can be readily designed to operate at substantially or practically zero tolerance, and therefore present significant improvement over prior art techniques directed at rare cell type isolation. It will be appreciated that in, for example, the isolation of fetal cells from a maternal blood sample, zero tolerance is essential and further that present day techniques for isolation of fetal cells from maternal blood samples fail to perform at zero tolerance and are therefore rarely used in medical practice.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method which can be used to identify and sort out rare cells from a mixed population of cells. Specifically, the present invention can be used to isolate fetal cells such as, for example, trophoblasts, from maternal blood by utilizing an image processor and a micromanipulator for morphologically identifying and thereafter retrieving trophoblasts from the mixed population of blood cells present in a maternal blood sample. It will be appreciated in this respect that the trophoblast cell was trendwise selected against as a candidate for a maternal blood derived fetal cell for prenatal genetic diagnosis due to its rarity. The reason for that is the use of unique antibodies for enrichment of fetal cells which fail to provide zero tolerance over the huge background of maternal cells. It will further be appreciated that the use of trophoblasts for subsequent prenatal genetic is analysis is advantageous because each trophoblast cell includes 30–50 nuclei, i.e., 30–50 fold more DNA as is compared to other maternal blood derived fetal cells. This unique feature of the trophoblasts was overlooked by the general trend of fetal cell isolation.

The principles and operation of a system and method for morphologically identifying and sorting out rare cells from a mixed population of cells according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
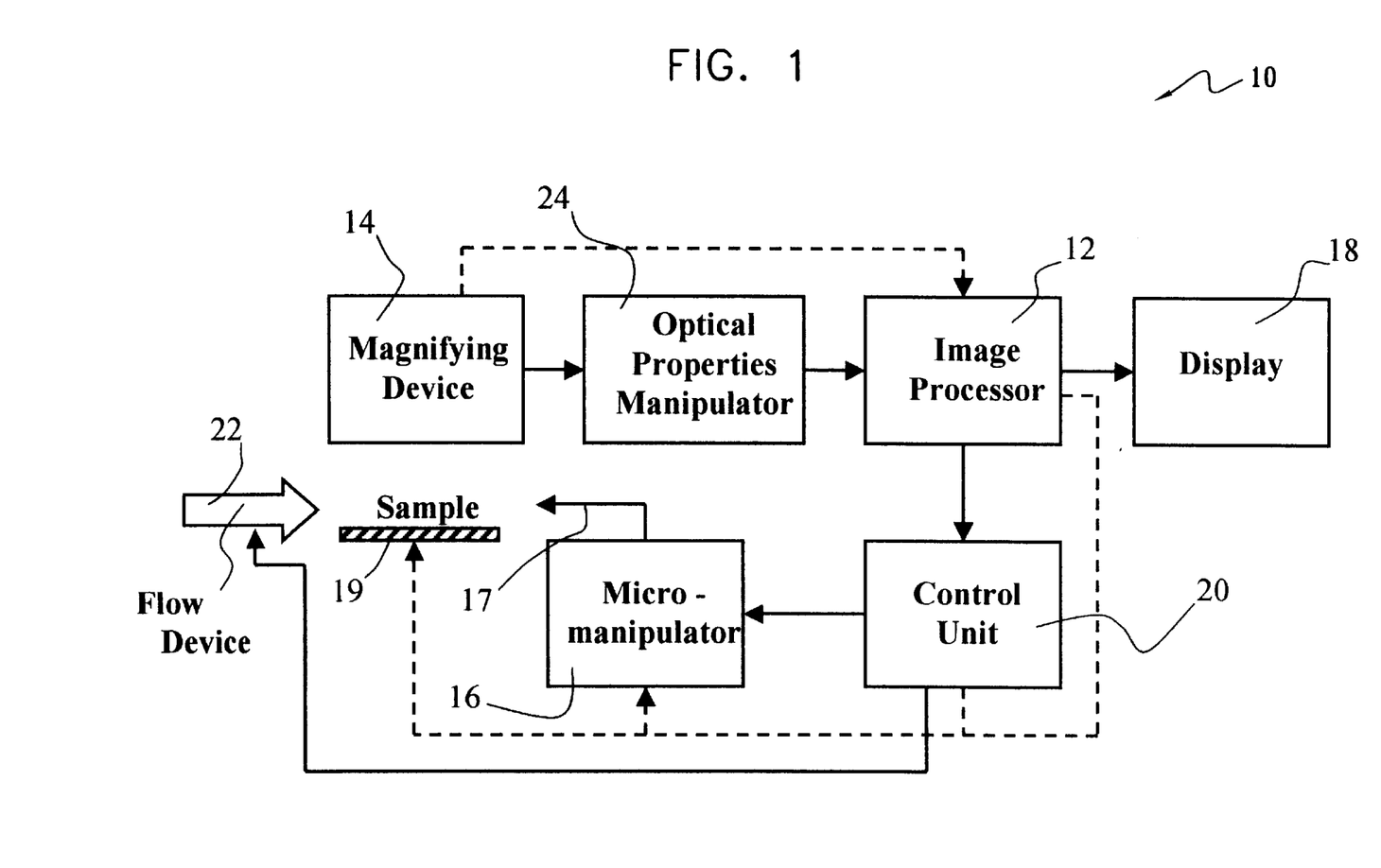
FIG. 1 is a black box diagram of a system for isolating a rare cell type from a mixed cell population according to the present invention, alternative coupling routes are shown in dashed lines.

Referring now to the drawings, FIG. 1 illustrates a cell isolation system according to the present invention, which is referred to hereinbelow as system 10.

System 10 according to the present invention serves for morphologically identifying and sorting out a rare cell type (rare cells) from a mixed population of cells As used herein in the specification and in the claims that follows, the phrase "rare cell type" refers to a cell type occurring or found infrequently in the mixed population of cells, e.g., at a frequency of less than 1 per 1000, 1 per 1000 to 1 per 10,000, 1 per 10,000 to 1 per 100,000, 1 per 100,000 to 1 per 500,000, 1 per 500,000 to 1 per 1000,000, 1 per 1,000,000 to 1 per 10,000,000, or less.

As used herein in the specification and in the claims that follows, the phrase "cell type" refers to cells sharing a characteristic morphological feature or features which differ from other cells in a mixed population of cells.

System 10 according to the present invention includes an image processor 12. Image processor 12 is designed for morphologically differentiating a rare cell type from the mixed population of cells, such as, for example, fetal cells from which are present in a maternal blood sample.

System 10 according to the present invention further includes a magnifying device 14. Device 14 communicates with image processor 12. Magnifying device 14 serves for providing a magnified image of at least a portion of a sample containing the mixed cell population to image processor 12 for image processing. To this end, magnifying device 14 can be any device which is capable of magnifying a scene located in its field of view, such as a light microscope, including, but not limited to, a confocal light microscope, a phase microscope, in either upright or preferably inverted configuration.

System 10 according to the present invention further includes a micromanipulator 16. Micromanipulator 16 serves for retrieving rare cells of the rare cell type from the mixed population of cells, preferably according to information provided by image processor 12.

As used herein in the specification and in the claims section that follows, the term "micromanipulator" includes devices capable of micro adjustment is position and or orientation and which are equipped with an aspirating needle having a fine (e.g., pulled) tip and capable of single cell collection and manipulation. A micromanipulator which can be used with system 10 according to the present invention and while implementing the method of the present invention for isolating a rare cell type from a mixed population of cells is described for example, in U.S. Pat. No. 5,845,541, which is incorporated herein by reference.

According to one embodiment of the present invention, identification and retrieval of the rare cell type is effected manually by an operator of system 10. To this end, image processor 12 includes a display 18 which serves for displaying the magnified image provided by magnifying device 14.

Thus, according to this embodiment of the present invention and in order to isolate the rare cell type, the operator visually scans the magnified image displayed by display 18 and manually controls and operates micromanipulator 16 to thereby retrieve the rare cell type. Since such an isolation procedure is tedious and time consuming, especially when rarity is increased, it is limited to low throughput and as such is restricted to scanning a small total number of cells, which results in the isolation of a relatively small number of the rare cells.

Thus, according to another and presently preferred embodiment of the present invention, identification and retrieval of the rare cell type is effected automatically or semi automatically via system 10.

According to this embodiment of the present invention processor 12 is capable of automatically or semi automatically differentiating the rare cell type from the mixed population of cells according to distinguishable morphological features associated with the rare cell type. To this end, image processor 12 includes image analysis software for analyzing images and recognizing the rare cell type. Such image analysis software is well known in the art, examples of which include commercially available software such as, but not limited to, the Matrox image library (MIL) (for further information see, http://www.matrox.com/imgweb/products/mil/mil.htm), the Aphelion product package from Amerinex which includes the CellDetectionPro application, the CometPro application and the ImagePath's Ploidy application (for further information see, http://www.aai.com:80/imaging/compnts.html). Both the Matrox image library and the Aphelion product package utilize algorithms for edge detection or edge enhancement (see, for example, U.S. Pat. No. 5,311,600, which is incorporated herein by reference), segmentation and blob analysis in order to analyze cell images. Such and additional algorithms useful for implementing the present invention are further described in, for example, U.S. Pat. No. 4,878,114 teaching a method and apparatus for assessing surface roughness; U.S. Pat. No. 4,969,198, teaching a system for automatic inspection of periodic patterns; U.S. Pat. No. 5,830,141, teaching image processing for automatic detection of regions of predetermined cell types; U.S. Pat. No. 5,099,521 teaching a cell image processing system, all of which are incorporated herein by reference.

In addition, many image analysis workstations which can be used in conjunction with a light microscope and are therefor utilizable by system 10 of the present invention are commercially available from Integrated Imaging Inc. (see, http://www.i-cubeinc.com/products.htm) and Intelligent Medical Imaging Inc. (see, http://www.imii.com/html/products.html.). See also, U.S. Pat. No. 5,835,155 teaching a video frame drabber which includes an analog video signals analysis system; U.S. Pat. No. 4,000,417 teaching a scanning microscope system with cell find and autofocus functions; U.S. Pat. No. 5,875,258 teaching processing integrity control system; U.S. Pat. No. 5,554,505 teaching a system for optically screening microscopic cells; and U.S. Pat. No. 5,352,613, teaching a method for cytological screening, all of which are incorporated herein by reference.

In addition, according to a preferred embodiment of the present invention, image analysis is at least partially based on comparison of features of a cell undergoing analysis to a library or archive of cells of the type searched for. Such a library is constructed from formerly identified and validated cells, which can contribute to a process of comperative image processing.

It will be appreciated by one ordinarily skilled in the art that since the system of the present invention provides the ability to identify and isolate rare cells according to distinct morphological features it is free of the inherent limitations associated with the prior art cell isolation systems and methods as follows.

Prior art systems and methods which rely on antibody associated isolation (i.e., affinity columns, FACS and MACS) posses a major limitation. These methods depend on the affinity of antibodies to unique surface markers present on some rare cell types. Although such antibodies are generated antigen specific, undesirable cross reactions to other cell types occurs, since the desired cells are rare within the sample and as such the background cell types are in overwhelming abundance. Due to this limitation, the prior art systems and methods cannot achieve zero tolerance for maternal DNA containing cells, since due to the cross reactivity of these antibodies some contamination with undesirable maternal cell types always occurs. Even the anti 5T4-trophoblast-antigen antibody described in U.S. Pat. No. 5,869,053, or the monoclonal antibodies described in Hawes S. C "A morphologic study of trophoblast isolated from peripheral blood of pregnant women" Am. J. Obstet. Gynecol. Vol. 170, pages 1297–1300, fail to bind solely to trophoblasts. On the other hand, since the system of the present invention utilizes image analysis for cell sorting by morphology such contamination is improbable and as such the accuracy of such a system is far greater than prior art systems. In fact, depending on the sensitivity of the image analysis, zero tolerance for maternal DNA containing cells can be achieved.

Thus, by employing image analysis as herein described, specific and morphologically distinct rare cell types can be identified by processor 12. Upon identification of a rare cell type of choice, processor 12 relays information pertaining thereto to micromanipulator 16, so as to command micromanipulator 16 to retrieve the rare cell identified.

To this end, and according to another preferred embodiment of the present invention, system 10 further includes a control unit 20. Control unit 20 serves for retrieving the information from processor 12 and for generating a command signal commanding micromanipulator 16 to retrieved a rare cell identified by image processor 12. Such a command typically involves translating a scanning device 19 (see below) in the xy directions, so as to bring the rare cell to the zone of micromanipulation, underneat aspirating needle 17 of micromanipulator 16, directing needle 17 to the identified rare cell, typically in the xyz planes, and operating micromanipulator 16 to retrieve the identified rare cell via needle 17. The cell is thereafter ejected from needle 17 into a collection tube. Control unit 20 can be integrated in processor 12, micromanipulator 16, be a stand-alone unit, or be electrnically divided between micromanipulator 16 unit 20 and/or the stand-alone unit. For example, a personal computer having an interface with both processor 12 and micromanipulator 16 can be programmed to serve the functions herein described with respect to control unit 20. Such programming can be readily achieved by one ordinarily skilled in the art.

According to preferred embodiments of the present invention the cells present in the analyzed samples are scanned. Scanning can be effected by a manual, semi automatic or automatic scanning device capable of ordered and repeatable scanning movement, e.g., a raster movement. All light microscopes are inherently equipped with a scanning device. Alternatively, scanning of the sample is effected by a sample flow device as further detailed below.

Thus, according to a preferred embodiment of the present invention, system 10 further includes a sample flow device 22. Device 22 serves for providing a continuous flow of the sample to magnifying device 14 such that a high throughput can be achieved. In this case, when a cell of the desired rare cell type is identified by image processor 12, device 22 is commanded, preferably via control unit 20 and according to information received from processor 12, to halt the flow of the sample, such that the identified rare cell can be retrieved by micromanipulator 16 in a manner as described above. In addition and according to the manual operation embodiment of system 10 which is further described hereinabove, halting the flow of the sample to magnifying device 14 can be effected manually by the operator such that manual retrieval of the rare cell type via micromanipulator 16 can be effected. A dynamic image analysis system of mobile objects is disclosed in U.S. Pat. No. 5,655,028, which is incorporated herein by reference.

According to another preferred embodiment of the present invention, system 10 further includes a mechanism or optical properties manipulator 24 which serves for manipulating the optical properties of the magnified image generated by magnifying device 14. Mechanism 24 is coupled to magnifying device 14 and image processor 12. Alternatively mechanism 24 can form a part of either magnifying device 14 and/or image processor 12. Optical manipulation effected by mechanism 24 serves for enhancing the image of the population of mixed cells, such that cellular morphological features, including, for example, shape, size, outer cell edge, cellular components and the like, are enhanced and are therefore more readily identifiable and detectable by the image analysis software operating with processor 12. Many examples of hardware and software configurations which can be used with mechanism 24 are known in the art, examples of which include Nomarski lenses or software and phase constrast. Nomarski is a form of microscopy especially suited for the evaluation of surface quality and defects. The Nomarski illumination method incorporates polarization and phase shift techniques which cause minute departures of the surface from a perfect plane to appear as different colors. Phase contrast is an optical method devised by F. Zernike for converting the focused image of a phase object (one with differences in refractive index or optical path but not in absorbance), which ordinarily is not visible in focus, into an image with good contrast.

Since cells are typically transparent to light in the visible spectrum, to further enhance the morphological features of the analyzed cells and to render such cells more detectable by image processor 12, staining of the cells prior to their analysis can be effected. Since the rare cells to be collected by manipulator 16 are preferably collected in a viable state, as upon lysis cell morphology changes dramatically, such staining is preferably selected compatible with cell viability. In addition, since, in order to achieve zero tolerance morphological recognition of cells is employed by the present invention, such staining is preferably effected by morphology enhancing stains.

Stains which are compatible with viability and which enhance morphological features of cells are well known in the art and include, for example, antibody conjugated stains, which antibodies are directed at specific recognition of haptens associated with the morphology of cells, e.g., haptens derived from components of the membrane scaffold which are exposed to the extracellular environment.

The contrast provided by staining according to the present invention provides additional morphological information to image processor 12 or to the operator of system 10, thereby enabling a more accurate and efficient cell identification.

To further improve the accuracy and efficiency of system 10 of the present invention a step of increasing the specific concentration of the desired rare cell type is preferably employed prior to the processing of the sample by system 10. Such enrichment can be effected by a procedure which can include, for example, gradient centrifugation, affinity purification, affinity exclusion, size exclusion chromatography, selective cell lysis and any combination thereof.

For example, when isolating fetal cells, such as, for example, fetal platelets, fetal trophoblasts, fetal nucleated red blood cells or fetal leukocytes from a maternal blood sample containing an overwhelming majority of maternal cells, several procedures can be used to dramatically increase the specific concentration of such fetal cells within the maternal blood sample. Selective hypotonic cell lysis or lysing antibodies can be used for lysing, for example, maternal erythrocytes which comprise the largest fraction of the cells included within the maternal blood sample. In addition, antibodies with specific affinity to maternal cell surface markers such as, for example, anti-CD4 or anti-CD8 antibodies or any antibodies with a high affinity to maternal cell surface markers can be utilized in a variety of procedures such as affinity columns and flow cytometry to select out maternal cells recognized by such antibodies in what is referred to as affinity exclusion (see also Johansen M. et al. "An investigation of methods for enriching trophoblast from maternal blood", Prenatal Diagnosis, 15:921–931, 1995). Furthermore, size exclusion chromatography which can be effected by for example size exclusion columns can be employed to select for cells of a predetermined cell size. Finally, gradient centrifugation using, for example, ficoll or percol gradients can also be used to enrich for certain fetal cell types. These procedures are well known to the skilled artisan and can be modified and fine tuned thereby to be best suited for any specific application envisaged for the present invention.

In one mode of operation system 10 is operated fully automatically. Thus, according to this mode a sample of a mixed population of cells is scanned and rare cells are identified by image processor 12 and collected by manipulator 16 without man intervention. Following the collection of the rare cells, manual inspection of the cells collected can be enacted to ensure zero tolerance for other cells, if so required.

In another mode of operation system 10 is operated semi automatically. According to this mode of operation a sample of a mixed population of cells is automatically scanned and rare cells are identified by image processor 12. The location or coordinates of such rare cells are memorized by image processor 12. When the scan is completed, an operator is notified. The operator then views and approves each of the cells identifies by system 10 as rare. Then, upon a command of the operator, micromanipulator 16 is activated to automatically collect the approved cells, to thereby ensure zero tolerance for other cells, if so required.

According to a preferred embodiment of the present invention system 10 is used for isolating fetal trophoblasts from a maternal blood sample. The fetal trophoblast isolated are preferably used for prenatal diagnosis procedures, such as diagnosis of genetic disorders and karyotyping, as further detailed hereinunder.

Figure 2:
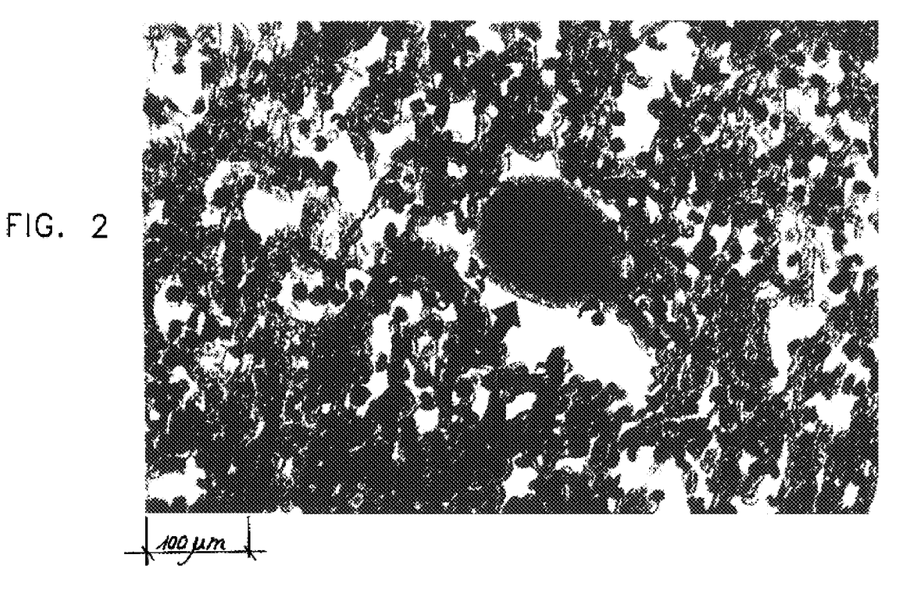
FIG. 2 is a photograph showing a fetal trophoblast (marked by the arrow) derived from broad ligament veins, 26 weeks' gestation, surrounded by smaller cells, mostly erytrocytes, reproduced from FIG. 11 of Douglas et al., "Trophoblast in circulating blood. Am. J. Obst. & Gynec. 78(5):960–973, November, 1959.

Trophoblasts are rare (about 1/1,000,000 cells in erythrocyte depleted maternal blood sample), multinucleated (30–50 nuclei, each of about 10 $\mu$m in diameter) and exceptionally large fetal cells (100–200 $\mu$m in diameter, see FIG. 2) present in maternal blood samples. As such, although rare, trophoblasts are easily distinguishable from other fetal and maternal cells (typically 5–50 $\mu$m in diameter) contained within the maternal blood sample. Thus, identification of trophoblasts can readily be effected based on their distinguished size.

Megakaryocytes are the largest maternal cells which may be present in a maternal blood sample (50–100 $\mu$m in diameter). Megakaryocytes are also multinucleated, typically including 5–10 nuclei of notched shape. Nevertheless, except for size and number and shape of nuclei, additional morphological features distinguish trophoblasts from Megakaryocytes, which additional morphological features can be recognized by the image processing algorithms of image processor 12 according to the present invention. Such additional distinguishing morphological features include, for example, amorphous cell shape for megakaryocytes as compared to a more rounded cell shape for trophoblasts.

Thus, image processor 12 of system 10 can utilize edge detection algorithms to identify a cell's boundaries to thereby distinguishably analyze its shape and size. Accordingly, a predetermined cell size range corresponding to the typical size range of trophoblasts is selected for. Alternatively, when utilizing system 10 in its manual configuration, operator detection of trophoblasts can be effected via display 18.

It will be appreciated that the contrasting and enrichment methods described hereinabove can be customized in this case to provide the best possible mode of practice for isolating trophoblasts from a maternal blood sample.

The following provides some considerations for the isolation of fetal trophoblasts from maternal blood. 1 ml of maternal blood includes roughly $10^9$ anucleated red blood cells which are readily removable as further discussed above, and roughly $10^6$ nucleated maternal white blood cells. The abundance of fetal trophoblasts is roughly one per 1 ml of whole maternal blood. Thus, by analyzing 1,000 5 $\mu$l samples, 5 ml of blood can be screened. Twenty 5 $\mu$l samples put into dedicated grooves having a depth of 0.2 mm and a radius of 3 mm in a slide are feasible. 20 such slides are required to screen 5 ml of blood, a total of 25,000 $mm^2$ to be screened. A camera of 768×584 pixels in and a magnification that results in a resolution of three pixels per 7 $\mu$m (roughly the diameter of a red blood cell) would need 6,000–9,000 frames to cover that area. Assuming 0.5 seconds per frame including exposure time of 100 ms per frame will results in total screening time of 4,500 seconds per 5 ml of blood, or 1.25 hours required to screen 5 ml of maternal blood, which is fairly reasonable.

Once isolated the rare fetal cells, e.g., trophoblasts, can be directly, or following in vitro propagation, as well known in the art of tissue culture, subjected to a prenatal diagnosis procedure, such as analysis of nucleic acids and analysis of proteins. In vitro propagation and/or etyrhropoietin enrichment of rare fetal cells is well known in the art and is secribed, for example, in Alter B. P. "Biology of erythropoiesis" Ann. NY Acad. Sci., 731:36–47, 1994; Lo Y. M. D. et al. "Culture of fetal erythroid cells from maternal peripheral blood", Lancet, 344:264–265, 1994; Valerio D. et al. "Culture of fetal erythrois progenitor cells from maternal blood for non-invasive prenatal genetic diagnosis", Prenat Diagn, 16:1073–1082, 1996; and in Irving J. A. et al. "Characteristics of trophoblast cells migrating from first trimester chorionic villus explants and propagated in culture" Placenta, 16:413–433, (1995), all of which are incorporated herein by reference.

Various methods are known in the art which may be used to detect and characterize specific nucleic acid sequences and sequence changes. Nonetheless, as nucleic acid sequence data of the human genome accumulates, the demand for fast, reliable, cost-effective and user-friendly tests for specific sequences continues to grow. Importantly, these tests must be able to create a detectable signal from a very low copy number of the sequence of interest. The following discussion examines three levels of nucleic acid detection currently in use: (i) signal amplification technology for detection of rare sequences; (ii) direct detection technology for detection of higher copy number sequences; and (iii) detection of unknown sequence changes for rapid screening of sequence changes anywhere within a defined DNA fragment.

Signal amplification technology methods for amplification: The "Polymerase Chain Reaction" (PCR) comprises the first generation of methods for nucleic acid amplification. However, several other methods have been developed that employ the same basis of specificity, but create signal by different amplification mechanisms. These methods include the "Ligase Chain Reaction" (LCR), "Self-Sustained Synthetic Reaction" (3SR/NASBA), and "Q$\beta$-Replicase" (Q$\beta$).

The polymerase chain reaction (PCR), as described in U.S. Pat. Nos. 4,683,195 and 4,683,202 to Mullis and Mullis et al., describe a method for increasing the concentration of a segment of target sequence in a mixture of genomic DNA without cloning or purification. This technology provides one approach to the problems of low target sequence concentration. PCR can be used to directly increase the concentration of the target to an easily detectable level. This process for amplifying the target sequence involves introducing a molar excess of two oligonucleotide primers which are complementary to their respective strands of the double-stranded target sequence to the DNA mixture containing the desired target sequence. The mixture is denatured and then allowed to hybridize. Following hybridization, the primers are extended with polymerase so as to form complementary strands. The steps of denaturation, hybridization, and polymerase extension can be repeated as often as needed, in order to obtain relatively high concentrations of a segment of the desired target sequence.

The length of the segment of the desired target sequence is determined by the relative positions of the primers with respect to each other, and, therefore, this length is a controllable parameter. Because the desired segments of the target sequence become the dominant sequences (in terms of concentration) in the mixture, they are said to be "PCR-amplified."

The ligase chain reaction (LCR; sometimes referred to as "Ligase Amplification Reaction" (LAR) described by Barany, Proc. Natl. Acad. Sci., 88:189 (1991); Barany, PCR Methods and Applic., 1:5 (1991); and Wu and Wallace, Genomics 4:560 (1989) has developed into a well-recognized alternative method for amplifying nucleic acids. In LCR, four oligonucleotides, two adjacent oligonucleotides which uniquely hybridize to one strand of target DNA, and a complementary set of adjacent oligonucleotides, which hybridize to the opposite strand are mixed and DNA ligase is added to the mixture. Provided that there is complete complementarity at the junction, ligase will covalently link each set of hybridized molecules. Importantly, in LCR, two probes are ligated together only when they base-pair with sequences in the target sample, without gaps or mismatches. Repeated cycles of denaturation, hybridization and ligation amplify a short segment of DNA. LCR has also been used in combination with PCR to achieve enhanced detection of single-base changes. Segev, PCT Publication No. W09001069 A1 (1990). However, because the four oligonucleotides used in this assay can pair to form two short ligatable fragments, there is the potential for the generation of target-independent background signal. The use of LCR for mutant screening is limited to the examination of specific nucleic acid positions.

Chemical amplification of nucleic acid is described, for example, in U.S. Pat. Nos. 5,846,709; 5,843,650; and 5,437,977, which are incorporated herein by reference.

The self-sustained sequence replication reaction (3SR) (Guatelli et al., Proc. Natl. Acad. Sci., 87:1874–1878, 1990), with an erratum at Proc. Natl. Acad. Sci., 87:7797, 1990) is a transcription-based in vitro amplification system (Kwok et al., Proc. Natl. Acad. Sci., 86:1173–1177, 1989) that can exponentially amplify RNA sequences at a uniform temperature. The amplified RNA can then be utilized for mutation detection (Fahy et al., PCR Meth. Appl., 1:25–33, 1991). In this method, an oligonucleotide primer is used to add a phage RNA polymerase promoter to the 5' end of the sequence of interest. In a cocktail of enzymes and substrates that includes a second primer, reverse transcriptase, RNase H, RNA polymerase and ribo-and deoxyribonucleoside triphosphates, the target sequence undergoes repeated rounds of transcription, cDNA synthesis and second-strand synthesis to amplify the area of interest. The use of 3SR to detect mutations is kinetically limited to screening small segments of DNA (e.g., 200–300 base pairs).

In the Qβ replicase method, a probe which recognizes the sequence of interest is attached to the replicatable RNA template for Qβ replicase. A previously identified major problem with false positives resulting from the replication of unhybridized probes has been addressed through use of a sequence-specific ligation step. However, available thermostable DNA ligases are not effective on this RNA substrate, so the ligation must be performed by T4 DNA ligase at low temperatures (37° C.). This prevents the use of high temperature as a means of achieving specificity as in the LCR, the ligation event can be used to detect a mutation at the junction site, but not elsewhere.

A successful diagnostic method must be very specific. A straight-forward method of controlling the specificity of nucleic acid hybridization is by controlling the temperature of the reaction. While the 3SR/NASBA, and Qβ systems are all able to generate a large quantity of signal, one or more of the enzymes involved in each cannot be used at high temperature (i.e., >55° C.). Therefore the reaction temperatures cannot be raised to prevent non-specific hybridization of the probes. If probes are shortened in order to make them melt more easily at low temperatures, the likelihood of having more than one perfect match in a complex genome increases. For these reasons, PCR and LCR currently dominate the research field in detection technologies.

The basis of the amplification procedure in the PCR and LCR is the fact that the products of one cycle become usable templates in all subsequent cycles, consequently doubling the population with each cycle. The final yield of any such doubling system can be expressed as: $(1+X)^n=y$, where "X" is the mean efficiency (percent copied in each cycle), "n" is the number of cycles, and "y" is the overall efficiency, or yield of the reaction (Mullis, PCR Methods Applic., 1:1, 1991). If every copy of a target DNA is utilized as a template in every cycle of a polymerase chain reaction, then the mean efficiency is 100%. If 20 cycles of PCR are performed, then the yield will be $2^{20}$, or 1,048,576 copies of the starting material. If the reaction conditions reduce the mean efficiency to 85%, then the yield in those 20 cycles will be only $1.85^{20}$, or 220,513 copies of the starting material. In other words, a PCR running at 85% efficiency will yield only 21% as much final product, compared to a reaction running at 100% efficiency. A reaction that is reduced to 50% mean efficiency will yield less than 1% of the possible product.

Many applications of nucleic acid detection technologies, such as in studies of allelic variation, involve not only detection of a specific sequence in a complex background, but also the discrimination between sequences with few, or single, nucleotide differences. One method for the detection of allele-specific variants by PCR is based upon the fact that it is difficult for Taq polymerase to synthesize a DNA strand when there is a mismatch between the template strand and the 3' end of the primer. An allele-specific variant may be detected by the use of a primer that is perfectly matched with only one of the possible alleles; the mismatch to the other allele acts to prevent the extension of the primer, thereby preventing the amplification of that sequence. This method has a substantial limitation in that the base composition of the mismatch influences the ability to prevent extension across the mismatch, and certain mismatches do not prevent extension or have only a minimal effect (Kwok et al., Nucl. Acids Res., 18:999, 1990).

A similar 3'-mismatch strategy is used with greater effect to prevent ligation in the LCR (Barany, PCR Meth. Applic., 1:5, 1991). Any mismatch effectively blocks the action of the thermostable ligase, but LCR still has the drawback of target-independent background ligation products initiating the amplification. Moreover, the combination of PCR with subsequent LCR to identify the nucleotides at individual positions is also a clearly cumbersome proposition for the clinical laboratory.

Direct Detection Technology: When a sufficient amount of a nucleic acid to be detected is available, there are advantages to detecting that sequence directly, instead of making more copies of that target, (e.g., as in PCR and LCR). Most notably, a method that does not amplify the signal exponentially is more amenable to quantitative analysis. Even if the signal is enhanced by attaching multiple dyes to a single oligonucleotide, the correlation between the final signal intensity and amount of target is direct. Such a system has an additional advantage that the products of the reaction will not themselves promote further reaction, so contamination of lab surfaces by the products is not as much of a concern. Traditional methods of direct detection including Northern and Southern blotting and RNase protection assays usually require the use of radioactivity and are not amenable to automation. Recently devised techniques have sought to eliminate the use of radioactivity and/or improve the sensitivity in automatable formats. Two examples are the "Cycling Probe Reaction" (CPR), and "Branched DNA" (bDNA).

The cycling probe reaction (CPR) (Duck et al., BioTech., 9:142, 1990), uses a long chimeric oligonucleotide in which a central portion is made of RNA while the two termini are made of DNA. Hybridization of the probe to a target DNA and exposure to a thermostable RNase H causes the RNA portion to be digested. This destabilizes the remaining DNA portions of the duplex, releasing the remainder of the probe from the target DNA and allowing another probe molecule to repeat the process. The signal, in the form of cleaved probe molecules, accumulates at a linear rate. While the repeating process increases the signal, the RNA portion of the oligonucleotide is vulnerable to RNases that may carried through sample preparation.

Branched DNA (bDNA), described by Urdea et al., Gene 61:2535–264 (1987), involves oligonucleotides with branched structures that allow each individual oligonucleotide to carry 35 to 40 labels (e.g., alkaline phosphatase enzymes). While this enhances the signal from a hybridization event, signal from non-specific binding is similarly increased.

Detection of unknown sequence changes: The demand for tests which allow the detection of specific nucleic acid sequences and sequence changes is growing rapidly in clinical diagnostics. As nucleic acid sequence data for genes from humans and pathogenic organisms accumulates, the demand for fast, cost-effective, and easy-to-use tests for as yet unknown mutations within specific sequences is rapidly increasing.

A handful of methods have been devised to scan nucleic acid segments for mutations. One option is to determine the entire gene sequence of each test sample (e.g., a bacterial isolate). For sequences under approximately 600 nucleotides, this may be accomplished using amplified material (e.g., PCR reaction products). This avoids the time and expense associated with cloning the segment of interest. However, specialized equipment and highly trained personnel are required, and the method is too labor-intense and expensive to be practical and effective in the clinical setting.

In view of the difficulties associated with sequencing, a given segment of nucleic acid may be characterized on several other levels. At the lowest resolution, the size of the molecule can be determined by electrophoresis by comparison to a known standard run on the same gel. A more detailed picture of the molecule may be achieved by cleavage with combinations of restriction enzymes prior to electrophoresis, to allow construction of an ordered map. The presence of specific sequences within the fragment can be detected by hybridization of a labeled probe, or the precise nucleotide sequence can be determined by partial chemical degradation or by primer extension in the presence of chain-terminating nucleotide analogs.

For detection of single-base differences between like sequences, the requirements of the analysis are often at the highest level of resolution. For cases in which the position of the nucleotide in question is known in advance, several methods have been developed for examining single base changes without direct sequencing. For example, if a mutation of interest happens to fall within a restriction recognition sequence, a change in the pattern of digestion can be used as a diagnostic tool (e.g., restriction fragment length polymorphism (RFLP) analysis).

Single point mutations have been also detected by the creation or destruction of RFLPs. Mutations are detected and localized by the presence and size of the RNA fragments generated by cleavage at the mismatches. Single nucleotide mismatches in DNA heteroduplexes are also recognized and cleaved by some chemicals, providing an alternative strategy to detect single base substitutions, generically named the "Mismatch Chemical Cleavage" (MCC) (Gogos et al., Nucl. Acids Res., 18:6807–6817, 1990). However, this method requires the use of osmium tetroxide and piperidine, two highly noxious chemicals which are not suited for use in a clinical laboratory.

RFLP analysis suffers from low sensitivity and requires a large amount of sample. When RFLP analysis is used for the detection of point mutations, it is, by its nature, limited to the detection of only those single base changes which fall within a restriction sequence of a known restriction endonuclease. Moreover, the majority of the available enzymes have 4 to 6 base-pair recognition sequences, and cleave too frequently for many large-scale DNA manipulations (Eckstein and Lilley (eds.), Nucleic Acids and Molecular Biology, vol. 2, Springer-Verlag, Heidelberg, 1988). Thus, it is applicable only in a small fraction of cases, as most mutations do not fall within such sites.

A handful of rare-cutting restriction enzymes with 8 base-pair specificities have been isolated and these are widely used in genetic mapping, but these enzymes are few in number, are limited to the recognition of G+C-rich sequences, and cleave at sites that tend to be highly clustered (Barlow and Lehrach, Trends Genet., 3:167, 1987). Recently, endonucleases encoded by group I introns have been discovered that might have greater than 12 base-pair specificity (Perlman and Butow, Science 246:1106, 1989), but again, these are few in number.

If the change is not in a recognition sequence, then allele-specific oligonucleotides (ASOs), can be designed to hybridize in proximity to the unknown nucleotide, such that a primer extension or ligation event can bused as the indicator of a match or a mis-match. Hybridization with radioactively labeled allelic specific oligonucleotides (ASO) also has been applied to the detection of specific point mutations (Conner et al., Proc. Natl. Acad. Sci., 80:278–282, 1983). The method is based on the differences in the melting temperature of short DNA fragments differing by a single nucleotide. Stringent hybridization and washing conditions can differentiate between mutant and wild-type alleles. The ASO approach applied to PCR products also has been extensively utilized by various researchers to detect and characterize point mutations in ras genes (Vogelstein et al., N. Eng. J. Med., 319:525–532, 1988; and Farr et al., Proc. Natl. Acad. Sci., 85:1629–1633, 1988), and gsp/gip oncogenes (Lyons et al., Science 249:655–659, 1990). Because of the presence of various nucleotide changes in multiple positions, the ASO method requires the use of many oligonucleotides to cover all possible oncogenic mutations.

With either of the techniques described above (i.e., RFLP and ASO), the precise location of the suspected mutation must be known in advance of the test. That is to say, they are inapplicable when one needs to detect the presence of a mutation of an unknown character and position within a gene or sequence of interest.

Two other methods rely on detecting changes in electrophoretic mobility in response to minor sequence changes. One of these methods, termed "Denaturing Gradient Gel Electrophoresis" (DGGE) is based on the observation that slightly different sequences will display different patterns of local melting when electrophoretically resolved on a gradient gel. In this manner, variants can be distinguished, as differences in melting properties of homoduplexes versus heteroduplexes differing in a single nucleotide can detect the presence of mutations in the target sequences because of the corresponding changes in their electrophoretic mobilities. The fragments to be analyzed, usually PCR products, are "clamped" at one end by a long stretch of G-C base pairs (30–80) to allow complete denaturation of the sequence of interest without complete dissociation of the strands. The attachment of a GC "clamp" to the DNA fragments increases the fraction of mutations that can be recognized by DGGE (Abrams et al., Genomics 7:463–475, 1990). Attaching a GC clamp to one primer is critical to ensure that the amplified sequence has a low dissociation temperature (Sheffield el al., Proc. Natl. Acad. Sci., 86:232–236, 1989; and Lerman and Silverstein, Meth. Enzymol., 155:482–501, 1987). Modifications of the technique have been developed, using temperature gradients (Wartell et al, Nucl. Acids Res., 18:2699–2701, 1990), and the method can be also applied to RNA:RNA duplexes (Smith et al., Genomics 3:217–223, 1988).

Limitations on the utility of DGGE include the requirement that the denaturing conditions must be optimized for each type of DNA to be tested. Furthermore, the method requires specialized equipment to prepare the gels and maintain the needed high temperatures during electrophoresis. The expense associated with the synthesis of the clamping tail on one oligonucleotide for each sequence to be tested is also a major consideration. In addition, long running times are required for DGGE. The long running time of DGGE was shortened in a modification of DGGE called constant denaturant gel electrophoresis (CDGE) (Borrensen el al., Proc. Nat. Acad. Sci. USA 88:8405, 1991). CDGE requires that gels be performed under different denaturant conditions in order to reach high efficiency for the detection of unknown mutations.

A technique analogous to DGGE, termed temperature gradient gel electrophoresis (TGGE), uses a thermal gradient rather than a chemical denaturant gradient (Scholz, el al., Hum. Mol. Genet. 2:2155, 1993). TGGE requires the use of specialized equipment which can generate a temperature gradient perpendicularly oriented relative to the electrical field. TGGE can detect mutations in relatively small fragments of DNA therefore scanning of large gene segments requires the use of multiple PCR products prior to running the gel.

Another common method, called "Single-Strand Conformation Polymorphism" (SSCP) was developed by Hayashi, Sekya and colleagues (reviewed by Hayashi, PCR Meth. Appl., 1:34–38, 1991) and is based on the observation that single strands of nucleic acid can take on characteristic conformations in non-denaturing conditions, and these conformations influence electrophoretic mobility. The complementary strands assume sufficiently different structures that one strand may be resolved from the other. Changes in sequences within the fragment will also change the conformation, consequently altering the mobility and allowing this to be used as an assay for sequence variations (Orita, et al., Genomics 5:874–879, 1989).

The SSCP process involves denaturing a DNA segment (e.g., a PCR product) that is labeled on both strands, followed by slow electrophoretic separation on a nondenaturing polyacrylamide gel, so that intra-molecular interactions can form and not be disturbed during the run. This technique is extremely sensitive to variations in gel composition and temperature. A serious limitation of this method is the relative difficulty encountered in comparing data generated in different laboratories, under apparently similar conditions.

The dideoxy fingerprinting (ddF) is another technique developed to scan genes for the presence of unknown mutations (Liu and Sommer, PCR Methods Appli., 4:97, 1994). The ddF technique combines components of Sanger dideoxy sequencing with SSCP. A dideoxy sequencing reaction is performed using one dideoxy terminator and then the reaction products are electrophoresed on nondenaturing polyacrylamide gels to detect alterations in mobility of the termination segments as in SSCP analysis. While ddF is an improvement over SSCP in terms of increased sensitivity, ddF requires the use of expensive dideoxynucleotides and this technique is still limited to the analysis of fragments of the size suitable for SSCP (i.e., fragments of 200–300 bases for optimal detection of mutations).

In addition to the above limitations, all of these methods are limited as to the size of the nucleic acid fragment that can be analyzed. For the direct sequencing approach, sequences of greater than 600 base pairs require cloning, with the consequent delays and expense of either deletion subcloning or primer walking, in order to cover the entire fragment. SSCP and DGGE have even more severe size limitations. Because of reduced sensitivity to sequence changes, these methods are not considered suitable for larger fragments. Although SSCP is reportedly able to detect 90% of single-base substitutions within a 200 base-pair fragment, the detection drops to less than 50% for 400 base pair fragments. Similarly, the sensitivity of DGGE decreases as the length of the fragment reaches 500 base-pairs. The ddF technique, as a combination of direct sequencing and SSCP, is also limited by the relatively small size of the DNA that can be screened.

Mismatches attacking nucleases, such as the S1 nuclease can also be used to distinguish between alleles differing by a point mutation.

Analysis of proteins derived from cells isolated and optionally enriched post isolation can be effected according to the present invention using any one or combination of well known procedures aimed at characterization of proteins, including, but not limited to, gel electrophoresis, e.g., PAGE both denaturing and non-denaturing, both single and two dimensional, Western blotting, in situ antibody recognition or staining, affinity separation, affinity chromatography and/or amino acids microsequencing. These and other methods used for protein analysis are well known in the art and are further described in, for example, Sambrok et al., molecular Cloning—A Laboratory Manual, Cold Spring Harbor Laboratory, Cold Spring Harbor, N.Y. (1989), which is incorporated herein by reference.

Fluorescent in situ hybridization (FISH) has evolved over the past 25 years through the improvement of a number of complementary techniques. Its emergence has been driven by the desire of cytogeneticists to develop better tools for mapping the precise location of genes on chromosomes, and to detect very small genetic defects not visible by gross staining of chromosomes. The human genome project (HGP), a bold initiative to identify and map all human genes, has identified interest in FISH and has hastened the development of much-needed DNA probes. Current FISH techniques have also been made possible by the concurrent development of powerful immunological probes, a growing variety of excellent fluorescent dyes for microscopy and spectroscopy, and dramatic improvements in the objectives, illuminators and filters used for fluorescence microscopy.

The power and utility of FISH is due to many factors: (i) FISH can be used not only on isolated chromosomes and nucleus, but also whole cells within fixed, paraffin-embedded tissue sections; (ii) it can detect relatively small defects (ability of detecting smaller defects being constantly increased); (ii) it can provide results relatively quickly; (iv) its moderate cost allows it to be used in most diagnostic and research laboratories; (v) adaptation can be developed for various probes and specimen types; and, (vi) high specificity and sensitivity can be achieved (vii) within a short time, typically in the range two hours.

Many FISH applications require only that the cytogeneticist look through the eyepieces of a microscope, or at the image on the monitor, to determine whether a fluorescent label is present or absent. With somewhat more complex specimens, a simple count of one or two colored labels may be done. However, the ability to process digital images and extract numerical data from them adds a vast new set of capabilities to FISH techniques. An appropriate imaging method, such as the method of the present invention, can enhance very faint FISH images so that labeled chromosomes and loci are clearly identifiable. Under readily achieved experimental conditions, the number of labeled sites can be automatically counted. In addition, the intensity at each labeled site can be measured and the amount of DNA calculated to reveal, for example, the number of copies present of a particular gene. Emerging techniques such as multicolor FISH employ color image analysis to detect and quantify multiple (3,4,5 and more) fluorescent probes.

As discussed above, FISH can provide information on the location of the labeled probe, the number of labeled sites on each chromosome, and the intensity of labeling (the amount of genetic material) at each site. Centromeric (repetitive DNA) probes and chromosome paints are used to tag and count the number of copies present of each targeted chromosome. Locus-specific probes are used to map the location of small regions of genetic material. These types of probes can be used on intact interphase nucleus as well as metaphase chromosome spreads, and can be counted visually or automatically by a suitable algorithm. They are routinely used to identify genetic diseases characterized by having too many or too few copies of a specific chromosome, chromosome fragment, or gene.

It is possible to uniformly label the entire surface of one specific chromosome by isolating the chromosome (using flow cytometry, for example), physically (e.g., by sonication) or enzymatically (e.g., by endonucleases) chopping it up, and generating a set of probes against all of the fragments. Whole chromosome probes, also known as chromosome paints, fluorescently label all copies of their target chromosome. One important application of chromosome painting is the detection of translocation of genetic material between two chromosomes, as characteristically occurs in early stages of certain cancers, yet other chromosome aberrations are also detectable.

FISH with conventional cytogenetic methods has been used on fetal cells recovered from maternal blood samples for sex determination (Wessman, M., et al., Prenat. Diag., 12:993–1000, 1992), and to detect chromosomal abnormalities, (Simpson, J. L., et al., Prenat. Diag., 12:S12, Supp., 1992).

Spectral methods and devices have been developed which are capable of analyzing complete karyotypes by presenting such karyotypes where every chromosome type is assigned a distinctive and identifying color, see, for example, U.S. Pat. Nos. 5,880,473; 5,871,932; 5,835,214; 5,817,462; 5,798,262; 5,784,162; and 5,719,024, which are incorporated herein by reference.

It will be appreciated in this context that the present invention which employs either non-stained samples or samples stained with a cell viability compatible stain, offers the opurtunity to propagate and therefore also synchtonise the isolated rare cells, rendering such cells amnable for karyotyping.

Thus, the system and method of the present invention provides an accurate substantially zero tolerance approach to the isolation and subsequent analysis of rare fetal cell types from maternal blood. It will be appreciated that a system capable of the above embodiments can be readily assembled from existing components and conventional programming. It will further be appreciated that the image processor hardware and software and the control thereof can be integrated into existing cell sorting systems.

Although the invention has been described in conjunction with specific embodiments thereof, it is evident that many alternatives, modifications and variations will be apparent to those skilled in the art. Accordingly, it is intended such alternatives, modifications and variations that fall within broad scope of the appended claims.

What is claimed is:

1. A method for isolating trophoblasts from a sample of maternal blood including a mixed population of cells, the method comprising the steps of:

(a) providing a magnified image of at least a portion of the sample of maternal blood;

(b) utilizing an image processor for automatically or semi auto-matically morphologically differentiating the trophoblasts from the mixed population of cells in said magnified image of said maternal blood to identify the trophoblasts from the population of cells; and (c) retrieving the identified trophoblasts using a micromanipulator.

2. The method of claim 1, further comprising the step of enriching the sample for the trophoblasts prior to said step of providing said magnified image.

3. The method of claim 1, further comprising the step of staining the population of cells with a viability compatible, morphology enhancing, stain prior to said step of providing said magnified image.

4. The method of claim 1, further comprising the step of optically manipulating said magnified image resulting from said step of providing said magnified image prior to said step of morphologically differentiating the trophoblasts from the mixed population of cells in said magnified image.

5. The method of claim 1, wherein said step of providing a magnified image is effected by a light microscope.

6. The method of claim 5, wherein said light microscope is selected from the group consisting of an inverted light microscope, a confocal microscope, and a phase microscope.

7. The method of claim 2, wherein said step of enriching the sample for the trophoblasts is effected by at least one procedure selected from the group consisting of gradient centrifugation, affinity purification, size exclusion chromatography and selective cell lysis.

* * * * *